United States Patent [19]

Pajak et al.

[11] 3,997,827
[45] Dec. 14, 1976

[54] SHADED POLE ELECTRIC MOTOR AND BRAKE

[75] Inventors: Robert A. Pajak, St. Paul; Richard B. Porter, Bloomington, both of Minn.

[73] Assignee: Honeywell Inc., Minneapolis, Minn.

[22] Filed: Apr. 3, 1975

[21] Appl. No.: 565,188

[52] U.S. Cl. .............................. 318/212; 318/382
[51] Int. Cl.² .......................................... H02P 3/24
[58] Field of Search .......... 318/199, 204, 212, 233, 318/237, 364, 379, 381, 382; 310/172

[56] References Cited
UNITED STATES PATENTS

| | | | |
|---|---|---|---|
| 3,367,296 | 2/1968 | Harruff | 318/382 X |
| 3,617,837 | 11/1971 | Beck | 318/212 |
| 3,872,363 | 3/1975 | Gross | 318/212 |

Primary Examiner—Robert K. Schaefer
Assistant Examiner—W. E. Duncanson, Jr.
Attorney, Agent, or Firm—Alfred N. Feldman

[57] ABSTRACT

A shaded pole electric motor which utilizes shading coils on the shaded poles is operated to provide a braking action. The shading coils are normally operated to cause the motor to operate either clockwise or counter-clockwise. The current flow in the shading coils is used to gate a triac for normal operation. When the triac is not gated, the energizing potential for the motor operates a unidirectional current control circuit to energize the motor winding with half-wave direct current to brake the motor.

11 Claims, 6 Drawing Figures

SHADED POLE ELECTRIC MOTOR AND BRAKE

BACKGROUND OF THE INVENTION

Shaded pole electric motors have been used extensively for many years for control purposes. These shaded pole motors utilize shading windings on shading poles and by opening or short circuiting the appropriate shading windings, the necessary shading action to cause the motor to rotate either in a clockwise or counterclockwise direction is developed. This type of motor normally has not been provided with any type of electromechanical brake, but has been used in modulating control applications.

Some control motors have been used with brakes where the brake action is developed by the armature of the motor shifting in the magnetic structure to center the rotor. This centering action is used to energize or de-energize a brake to lock the motor in the de-energized position. In shaded pole electric motors of larger sizes, this type of brake action has been inadequate or impractical.

Dynamic braking has been utilized with this general type of motor, as well as other electric motors, wherein a direct current potential is applied to the motor winding when the motor is de-energized. This normally requires a separate source of direct current potential and some type of switching arrangement to determine when the motor is de-energized. One of the simpler arrangements that has been used in the past is to charge a capacitor from a rectifier source connected to the energizing source for the electric motor, and then apply the capacitor to discharge through the motor winding to brake the motor operation to a stop. The use of a capacitor discharge does not, however, hold the motor at the braked position but merely aids in stopping the motor. The application of continuous direct current voltage to the motor winding has been provided in prior art arrangements from a direct current source, but this arrangement is very expensive in small control motors.

SUMMARY OF THE INVENTION

The present invention is directed to a unique arrangement of solid state switching that relies on the current flow in the shading coils of a shaded pole reversible type of alternating current motor. As previously indicated, this type of motor structure generally has relied on the circulating current in the shading windings to provide for the directional control of the motor. In the present invention the current flow in the shading coil is used as a gating or control current for a bidirectional current control means, such as a triac, to provide a full-wave alternating current to the motor. When the motor is to normally come to rest, the shading coil returns from a shorted state to an open circuit state thereby removing the rotational torque from the motor. In the present invention the removal of the shading coils from the control of direction also automatically initiates the operation of a unidirectional current control means, such as a simple diode or a gated silicon controlled rectifier, for supplying half-wave energy to the motor winding. This half-wave energy acts as a direct current dynamic type of brake that is continuously applied to lock the rotor in a fixed position as long as the control circuitry that operates the shading circuits is not calling for rotation of the motor.

In the present invention the control of the shading coil current can either be accomplished by switching of mechanical or solid state types, and can be used in conjunction with motor driven limit switches that are connected in series with the shading coil windings. These various circuit modifications and features will be brought out in the detailed description of the preferred embodiment.

DESCRIPTION OF THE PREFERRED EMBODIMENTS

Figure 4:
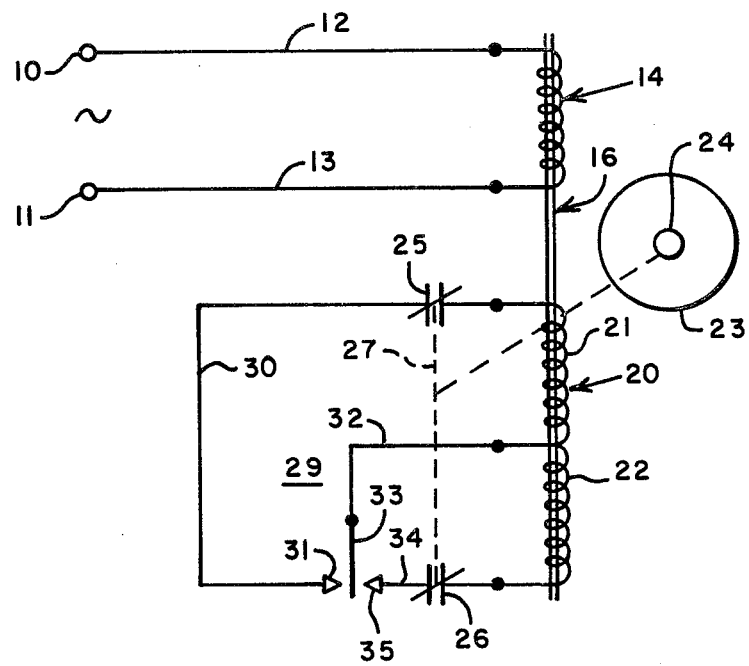
FIG. 4 is a schematic representation of a prior art shaded pole electric motor.

A conventional shaded pole electric motor has been disclosed in FIG. 4 as prior art to the present invention. The operation of this conventional shaded pole electric motor will be briefly described as a basis of description of the preferred embodiments of the invention.

A pair of terminals 10 and 11 are provided and are adapted to be connected to a source of alternating current such as a 24 volt source operating at 60 hertz. The terminals 10 and 11 are connected by wires 12 and 13 to a motor winding means 14 which is provided on a motor stator means 16. The motor stator means 16 further includes motor shading poles 20 which include a pair of motor shading coil means 21 and 22. The motor stator means 16 couples the magnetic flux generated in the motor winding means 14 in a conventional manner to the motor shading poles 20. The motor further includes motor rotor means 23 which has an output shaft 24. The motor rotor means 23 would typically be a squirrel cage rotor mounted in appropriate bearings so that its rotation and geared reduction provide a rotational output on shaft 24. Rotor means 23 might include slightly flatted sides 180° from each other to improve the later described braking action.

The use of shaded pole motors is typically in control applications, such as the movement of heating and cooling dampers and/or valves. In this type of application it is normal to use a pair of limit switches 25 and 26, which are mechanically linked at 27 to the shaft 24 so that when the shaft 24 has rotated the maximum permissible amount determined by the load carried on the shaft, one of the limit switches 25 or 26 will open circuit.

The shading coil means 21 is connected through the limit switch 25 by conductor 30 to a switch contact 31. The other side of the shading coil means 21 is connected by a common conductor 32 to a moveable switch member 33. The shading coil means 22 is common with the conductor 32 and further has a connection through the limit switch 26 to a conductor 34 and a switch contact 35. The switch contacts 31 and 35 along with the moveable member 33 have been schematically represented as a simple double throw, single pole switch configuration. This switch configuration is normally part of a balance relay that is operated by condition responsive means, such as will be disclosed in connection with FIG. 5. The switch components made up of the contacts 31, 35 and the moveable member 33 can also be replaced by solid state switching and the only requirement is that the switching arrangement be such that the shading coil means 21 can be short circuited, the shading coil means 22 can be short circuited, or the circuits through the shading coils can be left open with not resultant driving force available for the motor rotor means 23.

In the simplified shaded pole motor disclosed in FIG. 4, energy is supplied to the motor winding means 14 and with the switch 31, 33, 35 in its open condition, no rotation occurs. Upon completing a circuit between the contact 31 and the switch member 33, the motor rotor means 23 will rotate in one direction. The completion of the circuit between the contact 35 and the switch member 33 will cause the motor to operate in the opposite direction. This type of shaded pole electric motor has been used extensively in modulating temperature control and other related applications. This type of motor normally does not have any brake action to lock the motor against either a spring loaded or gravity operated load. The present invention overcomes that problem in a very simple, straight-forward manner. The elements associated with the shading coil means 21 and 22 make up shading circuit means 29.

Figure 1:
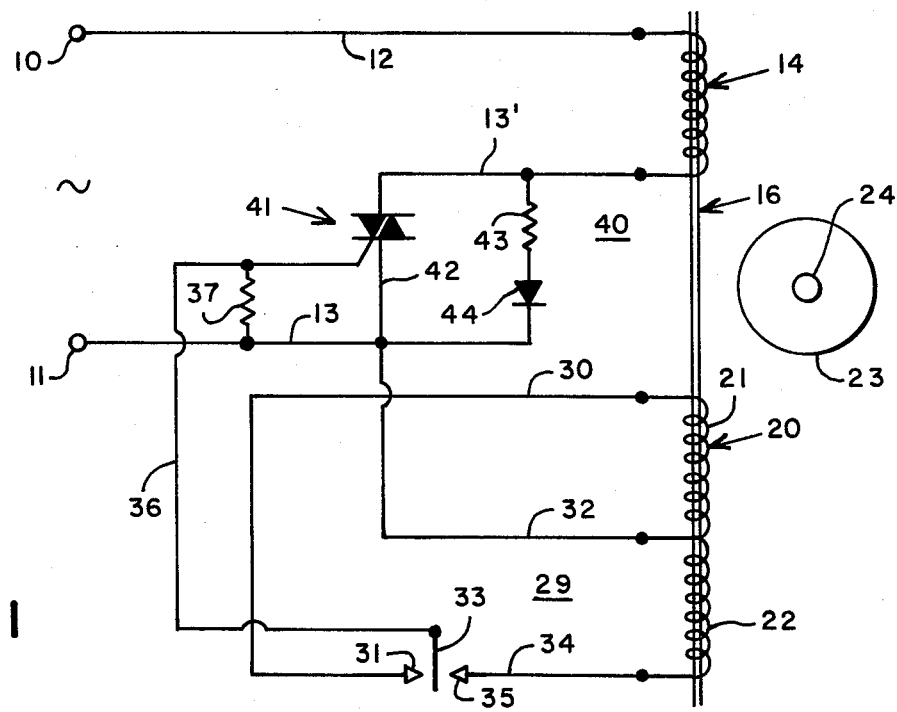
FIG. 1 is a schematic representation of a simple form of a shaded pole electric motor utilizing the present invention.

In FIG. 1 there is disclosed a simplified brake arrangement for a shaded pole electric motor. Terminals 10 and 11 are again provided with a 24 volt, 60 hertz voltage to be connected by conductors 12 and 13 to a motor winding means 14. The motor stator means 16 again is provided along with the motor shading poles 20 and the motor shading coil means 21 and 22. The motor rotor 23 and output shaft 24 are again provided, as are the conductors 30, 32, and 34 from the motor shading coil means 21 and 22. The circuit means 29 and switch arrangement is again disclosed having contacts 31 and 35 along with the moveable switch member 33, but in this case the moveable switch member 33 is connected by a conductor 36 through a resistor 37 back to the conductor 32.

The resistor 37 is in the gate circuit of a bidirectional current control means 41 disclosed as a triac. The triac 41 connects a conductor 13' from the motor winding means 14 through the triac 41 to conductor 42 to the conductors 13 and 32. A unidirectional current control circuit means 40 is provided by the addition of a further resistor 43 and diode 44 which are placed in parallel with the triac 41.

The operation of the shaded pole electric motor and brake disclosed in FIG. 1 is as follows. Energy is supplied to terminals 10 and 11 to electrically energize the entire motor. In the condition shown in FIG. 1 with the switch member 33 in its central or open position so that no contact is made with the contact 31 or 35, the circuit means 29 including the conductors 30, 32, 34, shading coil means 21, and shading coil means 22 is completely open circuited. With this arrangement, there is no energy flowing in the shading coil means 21 or 22 and the motor rotor means 23 should be at rest. If there is a mechanical load on the shaft 24 which would tend to rotate the motor rotor means 23, it is prevented in this case by current flowing through the motor winding means 14, resistor 43 and the diode 44 on every other half cycle of the applied alternating current. This provides half-wave, direct current in the motor winding means 14 and this direct current provides a brake action in the motor.

If it is desired to operate the motor rotor means 23, the switch member 33, for example, is moved to complete a circuit with contact 31. Current flows from the shading coil means 21 through the contacts 31, the switch member 33, conductor 36, and through the resistor 37 back to the common conductor 32 of the shading coil means 21. This current flow creates a voltage across the resistor 37 which gates the triac 41 into conduction each half-cycle thereby applying a full-wave alternating current through the motor winding means 14. The motor rotor means 23 will thus rotate in a direction determined by the selection of the motor shading coil means 21. Whenever the contact member 33 opens so that no circuit is provided to the shading coil means 21, the triac 41 ceases to conduct and current again begins to flow through the resistor 43 and the diode 44 to provide half-wave direct current braking to the motor. The motor operation can be reversed in direction by closing the switch member 33 to the contact 35 thereby allowing the current that is available in the motor shading coil means 22 to flow through the resistor 37 and gate the triac 41 into conduction.

It can be seen that a very simple arrangement wherein a bidirectional current control means 41 is activated whenever one of the shading coil means 21 or 22 is activated supplied the necessary alternating current to the motor winding means 14 to operate the motor. Whenever the shading coil means 21 and 22 are taken out of the circuit by opening the switch member 33, half-wave energy is supplied to the motor winding means 14 by means of the unidirectional current control means 40 including the resistor 43 and diode 44. The brake action is thus continuously applied from the main line energizing terminals 10 and 11 without any further auxiliary equipment.

It has been found that the arrangement in FIG. 1 is a very operable arrangement, but that power is unnecessarily lost in the heat generated in current flowing through the resistor 43. In order to make the operation of the motor more efficient, and eliminate the generation of a substantial amount of excess heat during the braking operation, the circuit of FIG. 2 has been developed. All of the similar circuitry will be identified with similar reference numbers and the functions will remain the same. Additional circuitry that is provided will be noted and explained.

Figure 2:
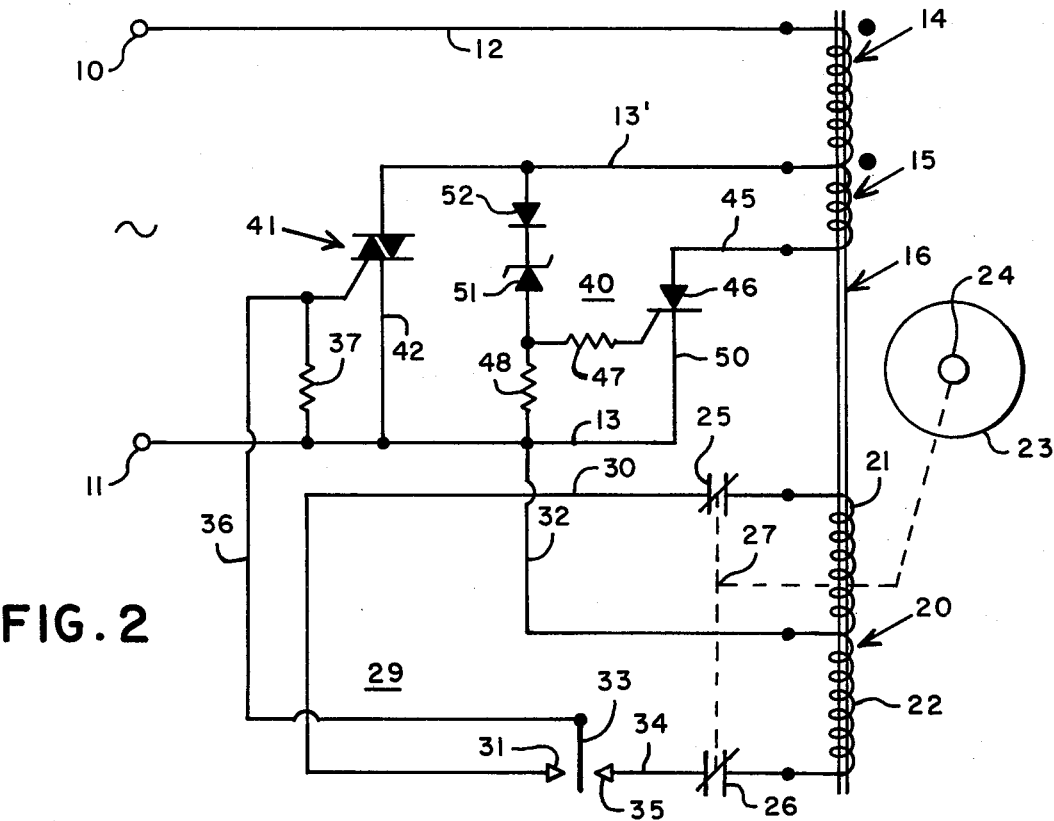
FIG. 2 is a modification of the circuit of FIG. 1.

The unidirectional current control means 40 in FIG. 2 uses an additional motor winding means 15 which is connected by conductor 45 to a silicon controlled rectifier 46 that includes a pair of gating resistors 47 and 48. The silicon controlled rectifier 46 of the unidirectional current control means 40 is further connected by conductor 50 to the conductor 32. The gating circuit for the unidirectional current control means 40 is completed by the use of a voltage breakdown means or zener diode 51 and a conventional diode 52 which are connected to the conductor 13'. In the disclosure of FIG. 2, the limit switches 25, 26 and the connection 27 to the output shaft 24 of the motor rotor means 23 is again disclosed.

The operation of the circuit of FIG. 2 is very similar to that of FIG. 1. In the condition disclosed with the circuit means 29 having the switch member 33 in the open position, there is not gating potential developed across the resistor 37 to energize the triac 41. As a result of that, current will flow through the conductor 12 to the motor winding means 14 and to the conductor 13' to the diode 52 and will build up across the zener diode 51 until the zener diode or voltage breakdown means 51 conducts to thereby generate a voltage across the resistor 48. The voltage across the resistor 48 is connected through resistor 47 to the silicon controlled rectifier 46 and gates it into conduction so that current flows through the winding means 15 of the motor and through the conductor 50 back to the conductor 13 connected to terminal 11. Winding means 14 and 15 form a first and a second winding portions for the motor of FIG. 2.

In this condition, the silicon controlled rectifier 46 conducts every other half cycle of the applied voltage to provide a half-wave braking force in the two winding portions 14 and 15 to effectively hold or brake the rotor means 23. The energy that would be dissipated in the resistor 43 of the arrangement in FIG. 1 is utilized in the motor winding means 15 in the present FIG. 2 as a braking action. The diode 52 insures that the silicon controlled rectifier 46 is activated only on the alternate half cycles, and the zener diode or voltage breakdown means 51 is utilized to give preference to operation to the triac 41 in the event that the motor is calling for operation. This will be seen in the following operational description.

In the event that it is desired to have the system of FIG. 2 rotate in one direction or another, the switch member 33, for example, would be closed to contact 31. Once again, the shading coil means 21 would provide energy to cause a current flow in the resistor 37 to gate the triac 41 into conduction. At this same time, a current would tend to flow through the diode 52 and the zener diode 51. The zener diode 51 blocks the flow of current long enough so that the triac 41 can be brought into conduction thereby shorting out the unidirectional current control means 40 to gain full rotational operation under the alternating current applied through the bidirectional current control means or triac 41. The reverse operation can be accomplished by closing the switch member 33 to the contact 35 and again the bidirectional current control means or triac 41 is given preferential operation by the zener diode 51 blocking out the operation of the brake until the triac 41 goes into conduction adhead of the voltage breakdown of the zener diode 51. It is obvious that once the traic 41 conducts it effectively shorts out the diode 52, the zener diode 51, and any voltage that would have been developed across the resistor 48 to operate the silicon controlled rectifier 46. The motor winding 14 has been selected in this case as the first portion of the motor winding means and is of the appropriate size to operate the motor. The second portion or the motor winding means 15 combines with winding means 14 to take advantage of the entire motor winding means as a brake element when the silicon controlled rectifier 46 is conducting.

Figure 3:
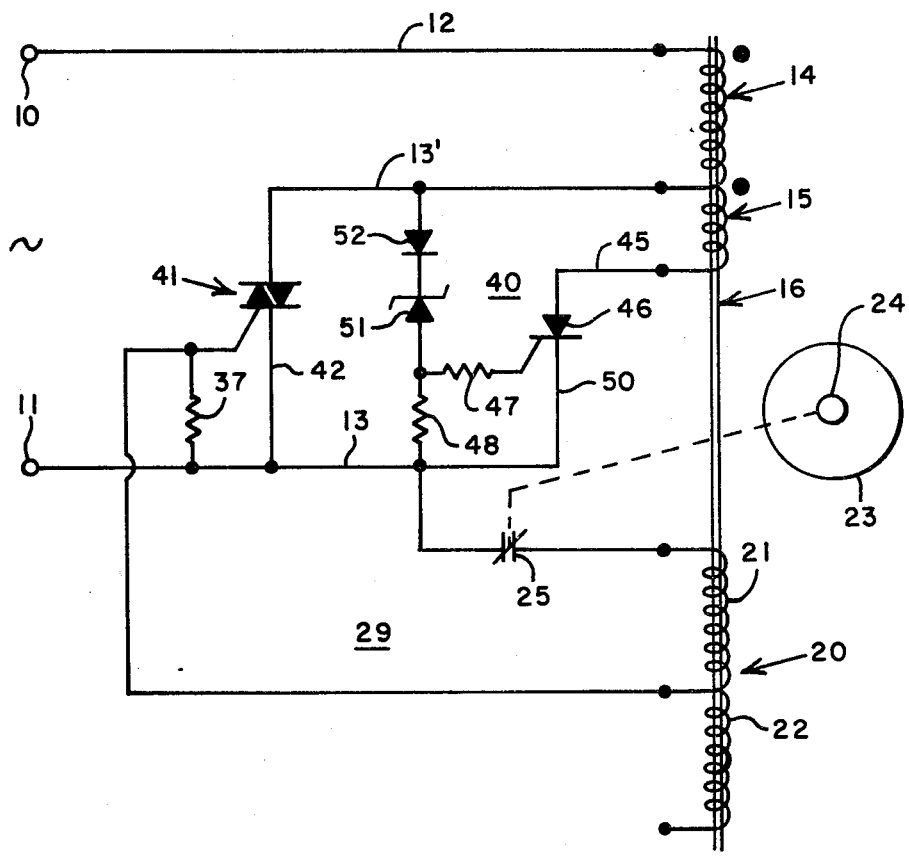
FIG. 3 is a schematic representation of a simple arrangement using a limit switch and a single shading coil means.

In FIG. 3 there is disclosed a circuit which for all practical purposes is the same as FIG. 2 except the circuit means 29 eliminates the switching 31, 33, and 35 along with the conductor 34 and the limit switch 26 so that the motor operates with its brake arrangement operable only through the limit switch 25. This particular arrangement is utilized where a motor is operated against a load, such as a return spring, and the brake is applied only at one extreme limit of operation by the limit switch 25 opening thereby applying the brake. The motor would run in the direction to open the limit switch, and would not return until power was removed from the entire system at terminals 10 and 11 to allow the spring load or other load on the motor shaft 24 to rotate the motor mechanically. In effect, the arrangement disclosed in FIG. 3 can be used wherever a spring loaded motor has been used for safety purposes to allow the spring load to return the motor to a starting position on power failure or other interruption of the power to the terminals 10 and 11.

Figure 5:
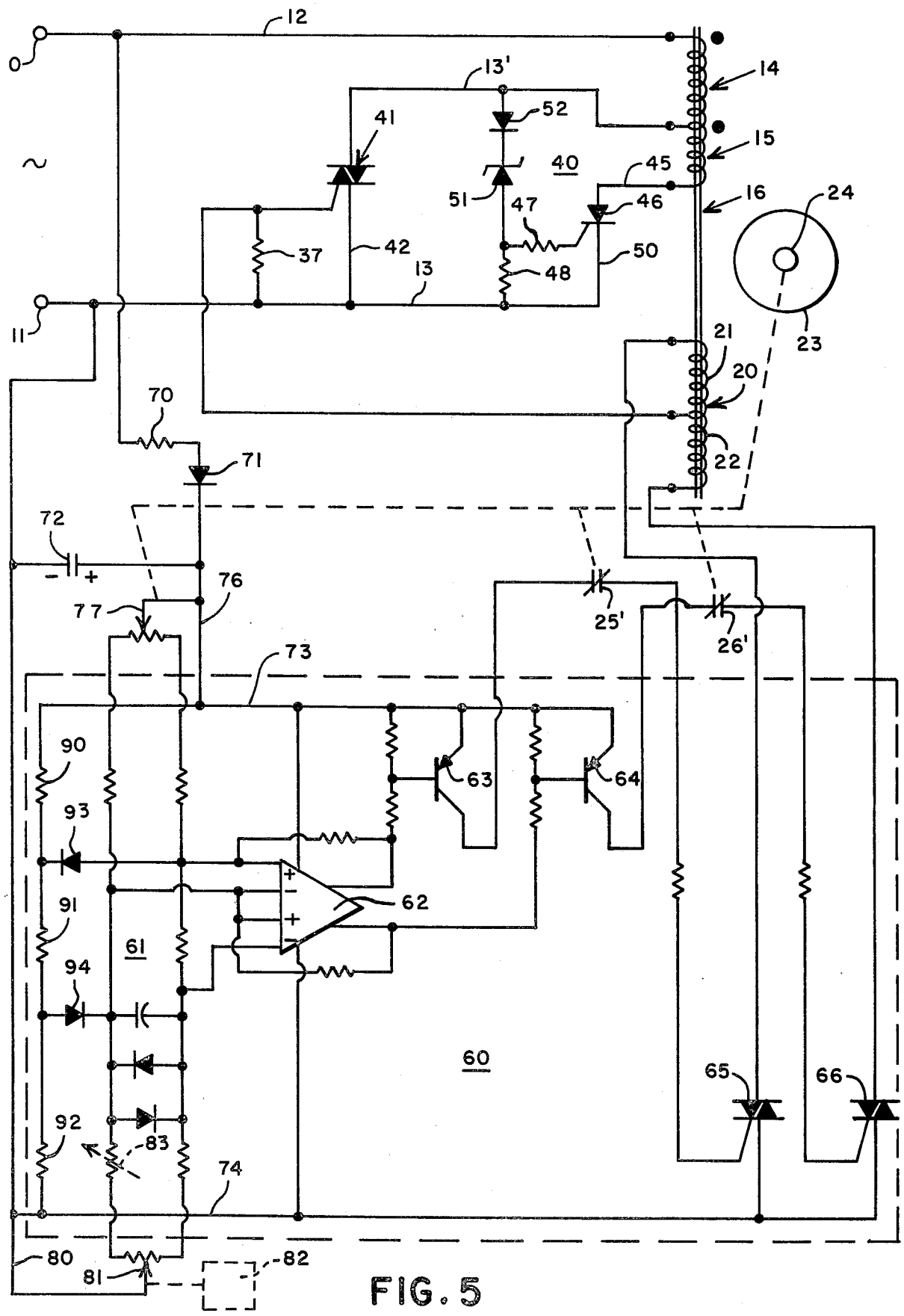
FIG. 5 is a detailed schematic disclosure of the present invention incorporating a rebalanceable bridge means and solid state switching for control of the current in the shading coils of a motor similar to that disclosed in FIG. 2.

In FIG. 5 there is disclosed a complete shaded pole electric motor control system utilizing the invention in the form disclosed in FIG. 2 along with a solid state switching means 60 which includes a rebalanceable bridge means 61 which further includes a differential amplifier 62 and a pair of output transistors 63 and 64. The output transistor 63 is connected through limit switch 25' while the transistor 64 is connected through a limit switch 26'. The limit switches 25' and 26' are connected in turn to a pair of solid state output switches 65 and 66 that are disclosed as triacs. The triac 65 is connected to the motor shading coil means 21 and the triac 66 is connected to the motor shading coil means 22. The triac 65 and 66 along with their gating circuitry of the solid state switching means 60 completely replace the switch elements 31, 33, and 35 in function.

To power the solid state switching means 60, a resistor 70 and diode 71 along with a capacitor 72 are connected across the terminals 10 and 11 to provide a direct current voltage to the conductor 73 and 74 of the solid state switching means 60. The voltage across the capacitor 72 is thus supplied to all of the circuitry in the solid state switching means 60 so that the amplifier 62 and the bridge means 61 are appropriately energized. The bridge means 61 is energized through the conductor 76 and a rebalanceable potentiometer 77 which forms part of the bridge means 61. A conductor 80 connected to a second potentiometer 81 provides the remainder of the energization of the bridge means 61 so that as the motor output shaft 24 rotates, the rebalanceable potentiometer 77 moves to establish a balance condition in the bridge means 61 to comply with the physical setting of the potentiometer 81 as established by some type of setting mechanism 82 which could be a manual setting means, a thermostat, pressure sensitive device, or any similar condition responsive means. The potentiometer wiper 81 could be fixed at any one point and a temperature or pressure responsive resistor 83 could be provided in the bridge means 61 in a conventional fashion to operate to unbalance the bridge in response to a condition sensed by the resistor 83. In this case, the potentiometer wiper 77 would be rebalanced by the motor output shaft 24 to establish the necessary balance condition.

The solid state switching means 60 also includes a voltage divider made up of resistors 90, 91, and 92 which are connected across the conductor 73 and 74. A pair of diodes 93 and 94 are provided between the voltage divider and the bridge elements. This arrangement is a prior art arrangement to protect the system so that it always operates in a preferential direction in the event that the wiper 77 lifts or becomes disconnected from the bridge. The disclosed solid state switching means 60 is a complete and commercially available switching arrangement that is capable of replacing the conventional balance relay disclosed as contacts 31 and 35 along with the moveable member 33 in FIGS. 1, 2, and 4.

The arrangement disclosed in FIG. 5 operates in exactly the same fashion as that in FIG. 2 wherein the triacs 65 and 66 operate to provide the switching function of the contacts 31, 35 and the moveable member 33. The operation of the triacs 65 and 66 are completely controlled by the condition of the bridge means 61, and this solid state switching means 60 thereby provides a completely solid state and vibration free switch means which can be used extensively in the air conditioning temperature control art for the operation of the shaded pole electric motor and brake arrangement disclosed in the upper portion of FIG. 5.

Figure 6:
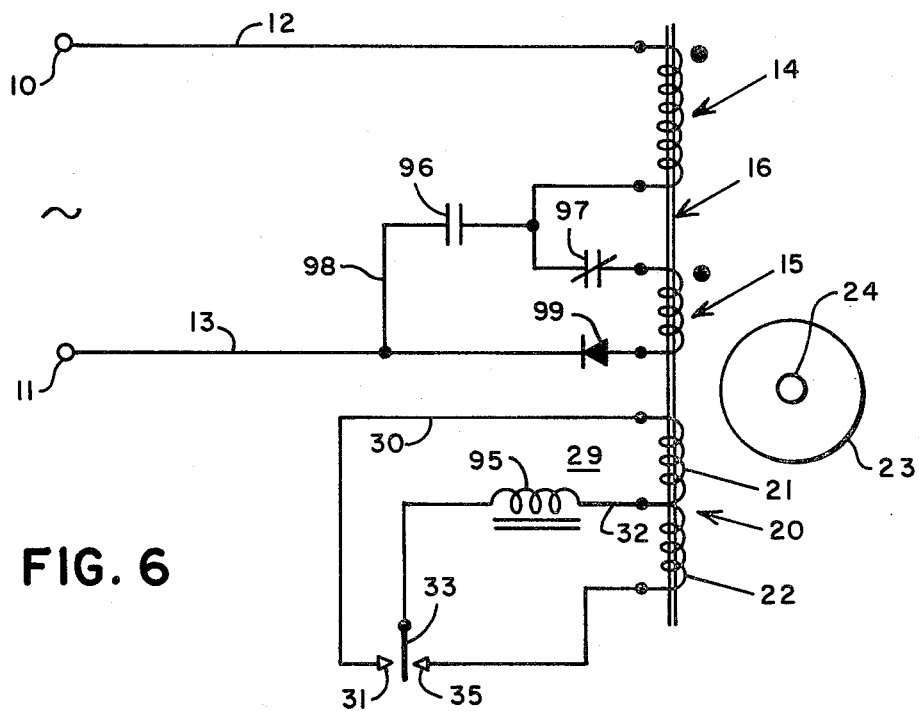
FIG. 6 is a simple relay controlled modification of FIG. 2.

In FIG. 6 a simplified mechanical version of the present invention is disclosed. The shading coil circuit means 29 includes a current responsive relay 95 which has a normally open contact 96 and a normally closed contact 97. The normally open contact 96 is connected between the conductor 98 and the junction of the motor winding means 14 and 15. The normally closed contact 97 is connected in series with the motor winding means 15, which further includes a rectifier 99.

In the position shown, the relay 95 is de-energized so that a unidirectional current flows through the winding means 14 and 15 to brake the motor. If switch member 33 is moved to complete a circuit through the relay 95, contact 96 closes and contact 97 opens. In this case, the motor is fully energized and will rotate in the direction determined by the position of switch means 33.

The present invention can be applied to any shaded pole electric motor which utilizes wound shading coils for controlling the operation of the motor. The arrangement of FIG. 1 discloses the simple use of a single motor winding means 14, while FIGS. 2, 3, 5, and 6 disclose the use of a two-part motor winding means. The motor can be energized from one part, and the brake operated from a larger number of motor windings thereby providing a more efficient braking arrangement than would otherwise be possible. The possible combinations of different switching arrangements, both mechanical and solid state, are numerous and the applicants in the present invention wish to be limited in the scope of their invention solely by the scope of the appended claims.

The embodiments of the invention in which an exclusive property or right is claimed are defined as follows:

1. A shaded pole electric motor, including: motor rotor means and motor stator means including motor winding means adapted to be connected to a source of alternating current to power said motor; motor shading poles including shading coil means having circuit means to in turn control a current flow in said shading coil means to cause said motor rotor means to operate; bidirectional current control means connected to said motor winding means and controlled by said shading coil current flow to energize said motor winding means with alternating current to cause said motor rotor means to operate; and unidirectional current control means connected to said motor winding means to pass a unidirectional current through said motor winding means to brake said motor means when said bidirectional current control means is not conducting to energize said motor winding means.

2. A shaded pole electric motor as described in claim 1 wherein said bidirectional current control means includes a triac to conduct said alternating current in said motor winding means whenever said shading coil circuit means carries said shading current flow.

3. A shaded pole electric motor as described in claim 2 wherein said unidirectional current control means includes a silicon controlled rectifier having a gating circuit which gates said silicon controlled rectifier every other half cycle of said alternating current when said triac is not conducting.

4. A shaded pole electric motor as described in claim 3 wherein said gating circuit includes a diode and voltage breakdown means to insure that said triac is given preference in condition at each half cycle of said alternating current until said voltage breakdown means conducts to gate said silicon controlled rectifier.

5. A shaded pole electric motor as described in claim 4 wherein said voltage breakdown means in a zener diode.

6. A shaded pole electric motor as described in claim 5 wherein said shading coil circuit means includes limit switch means controlled by said motor to open said limit switch means at the limits of travel of said motor to turn off said triac to in turn thereby energize said silicon controlled rectifier to brake said motor.

7. A shaded pole electric motor as described in claim 6 wherein said shading coil current flow is controlled by solid state switching means.

8. A shaded pole electric motor as described in claim 7 wherein said solid state switching means includes rebalanceable bridge means having a balance potentiometer connected to said motor to rebalance to said bridge means and brake said motor by interrupting said shading coil current flow.

9. A shaded pole electric motor as described in claim 1 wherein said motor winding means includes a first winding portion with said bidirectional current control means connected to conduct said alternating current through said first winding portion; and said motor winding means further including a second winding portion connected to said unidirectional current controlled means and said first winding portion to conduct said unidirectional current through both said portions to brake said motor.

10. A shaded pole electric motor as described in claim 9 wherein said bidirectional current control means includes a triac and said unidirectional current control means includes a silicon controlled rectifier.

11. A shaded pole electric motor as described in claim 1 wherein said bidirectional current control means is a current responsive relay and a normally open relay contact; and said unidirectional current control means is said relay and a normally closed relay contact and diode for application of a braking current when said relay is de-energized.

* * * * *

UNITED STATES PATENT OFFICE
CERTIFICATE OF CORRECTION

PATENT NO. : 3,997,827

DATED : December 14, 1976

INVENTOR(S) : ROBERT A. PAJAK and RICHARD B. PORTER

It is certified that error appears in the above-identified patent and that said Letters Patent are hereby corrected as shown below:

```
Claim 4, line 4, cancel "condition" and substitute
    --conduction--.
```

Signed and Sealed this

First Day of March 1977

[SEAL]

Attest:

RUTH C. MASON
Attesting Officer

C. MARSHALL DANN
Commissioner of Patents and Trademarks